US011903498B1

(12) United States Patent
Walker

(10) Patent No.: US 11,903,498 B1
(45) Date of Patent: Feb. 20, 2024

(54) PRODUCT DISPLAY SYSTEM HAVING TWO PRODUCT SUPPORT SURFACES THAT SUPPORT A PLURALITY OF PRODUCTS WITH AT LEAST ONE LED LIGHT STRIP

(71) Applicant: Brian Walker, Monticello, MN (US)

(72) Inventor: Brian Walker, Monticello, MN (US)

( * ) Notice: Subject to any disclaimer, the term of this patent is extended or adjusted under 35 U.S.C. 154(b) by 1250 days.

(21) Appl. No.: 16/501,246

(22) Filed: Mar. 12, 2019

Related U.S. Application Data

(63) Continuation-in-part of application No. 14/999,121, filed on Mar. 31, 2016, now Pat. No. 11,503,925.

(60) Provisional application No. 62/644,100, filed on Mar. 16, 2018, provisional application No. 62/178,830, filed on Apr. 20, 2015.

(51) Int. Cl.

| | |
|---|---|
| ***A47F 11/10*** | (2006.01) |
| ***G09F 9/35*** | (2006.01) |
| ***G09F 23/06*** | (2006.01) |
| ***A47F 3/00*** | (2006.01) |
| ***F21V 23/04*** | (2006.01) |
| ***F21S 4/20*** | (2016.01) |
| *F21W 131/405* | (2006.01) |
| *F21Y 103/10* | (2016.01) |
| *F21Y 115/10* | (2016.01) |

(52) U.S. Cl.
CPC .............. *A47F 11/10* (2013.01); *A47F 3/001* (2013.01); *F21S 4/20* (2016.01); *F21V 23/0435* (2013.01); *G09F 9/35* (2013.01); *G09F 23/06* (2013.01); *F21W 2131/405* (2013.01); *F21Y 2103/10* (2016.08); *F21Y 2115/10* (2016.08)

(58) Field of Classification Search
CPC .............. F21Y 2115/10; F21Y 2103/00; F21Y 2103/10; F21Y 2103/12; F21Y 2103/14; F21Y 2103/15; F21Y 2103/18; F21S 4/00; F21S 4/10; F21S 4/15; F21S 4/20; F21S 4/22; F21S 4/24; F21S 4/26; F21S 4/28; F21W 2131/405; A47F 11/10; G09F 23/00
See application file for complete search history.

(56) References Cited

U.S. PATENT DOCUMENTS

| | | | | |
|---|---|---|---|---|
| 8,646,935 B2 * | 2/2014 | Karan | .................. | A47B 96/061 362/240 |
| 2021/0023765 A1 * | 1/2021 | Ringel | .................... | B29C 51/42 |

* cited by examiner

*Primary Examiner* — Robert J May
(74) *Attorney, Agent, or Firm* — JOHNSON & PHUNG LLC

(57) ABSTRACT

A free standing display case with a product display system capable of displaying product and delivering multiple different messages with the illumination of the product and the illumination of a product display panel separable from each other with the information on the illuminated product display panel generated from a backlit panel and either conspicuous or inconspicuous changes in illumination from LED strip lights drawing a customers attention to products on the product display stand.

13 Claims, 6 Drawing Sheets

PRODUCT DISPLAY SYSTEM HAVING TWO PRODUCT SUPPORT SURFACES THAT SUPPORT A PLURALITY OF PRODUCTS WITH AT LEAST ONE LED LIGHT STRIP

CROSS REFERENCE TO RELATED APPLICATIONS

This application is a continuation in part of regular application Ser. No. 14/999,121 filed Mar. 31, 2016, which claims priority from provisional application Ser. 62/178,830 filed Apr. 20, 2015, and from provisional application 62/644,100 filed Mar. 16, 2018.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of display shelf risers or product display stands to hold products on display and permit store operators, such as those in the grocery store industry, and more specifically store operators who display their products on free standing display cases is known in the art. It is also known that it is appealing to the customers if one decoratively organizes the products for display within the display case. There exist different types of display cases, some refrigerated display cases and some non refrigerated cases with either are self serve so a consumer can open a door and remove a product from a product display stand while in other display cases the store operator needs to remove the product and hand it to the customer, which is particularly true in refrigerator display cases where meat products are sold by the pound. In those cases a meat product may be removed from the product display stand in refrigerator display case then sliced, weighed and price marked for checkout by the customer. Still in other display cases the product display stand be located on an open shelf or within an unrefrigerated display case. Typically, the product display stand needs to hold products thereon in a position so a potential customer can view them.

If the product display stand is in a display case it is necessary that the products on the product display stand are properly illuminated so the customer can readily see what products are available for purchase since transparent glass or plastic panels in front of a display case may preclude a purchaser from handling and inspecting the product in the display case. In some cases a product illumination light is located within the refrigeration case so that a consumer standing in front of the display case can properly view the products located on a product display stand therein. In other display cases one may attempt to take advantage of the available store lights to illuminate the products on the product display stand within the display case. Regardless of the type of display case and the illumination within the display case a storeowner needs to properly illuminate the product and the product display stand so the consumer can see what is available as well as to highlight the products and information on the products to attract a customer's attention to the products on the product display stand.

A poorly illuminated product on a product display stand may appear less appealing than a fully illuminated product or worse may not be seen by the consumer. Other factors may affect the illumination of the products and the product signs if the product display stand is located within a display case, for example some display cases are open and others are closed so that a store operator or a customer needs to open a door to remove the product. Typically, opening and closing a door may lead to signs therein becoming obscured by moisture. It is therefore important that a potential customer can see all the pertinent product information on the product display stand from a location outside the refrigerator case so that the customer or the store operator can open the refrigerator door and quickly remove a product from the product display stand without having to search for the product with the door open.

Product display stands such as product display risers are often used to hold products thereon and typically comprise a base having multi-level surfaces for supporting products thereon with some type of barrier to help retain the products on the product display riser.

It is also known in the art to place paper or plastic signs containing information regarding a product, such as the price of the product being displayed either on the display case, in the display case or on the product display stand. Typically, such minimum information as the brand name of the product and the price of the product needs to be visible to the consumer at all times. In most cases, the internal or incase signs are placed just above the products or at the base of product display stand, which often blocks the view of the product due to the size constraints of the product display stand. In addition, due to the size and static nature the aforementioned incase signs the signs usually have a difficult time drawing a consumer's attention to the product being displayed since the signs or the products may be poorly illuminated.

Another drawback of using the above traditional incase signs to convey information to potential consumers is that due to the static nature of the incase signs any changes to incase signs must be done manually and at each physical location, which can be both time consuming and laborious.

A further disadvantage, which may not be recognized, is that often the proper illumination of the product information incase sign and the proper illumination of the product may be difficult to achieve with either an internal or external light because the optimum light for illumination of product information and the optional lighting for product appearance may be different causing one or the other to be degraded.

While illumination of the product is important for a person to determine what is on a product display stand such as product display riser, which has multiple shelf levels, it is also important for attracting the attention of potential customers as well displaying a product in a manner so that the product stands out from the background on the product display riser. In the event there are a number of different products that are displayed on multiple product display risers, which may be in a row, it is also important that the product display risers are able to conspicuously display different products thereon in order to attract the attention of the consumer after removal of one or more products from the product display stand.

That is, one of the difficulties for stores that sell products that have a limited life is a need to draw attention to the products so the consumer can purchase and use a product before the product becomes stale and needs to be discarded. Oftentimes a reason a consumer may not purchase a product may be due to the differences in product packaging. That is the product packaging may draw a consumers attention to one product rather than another product when the products sit side by side on a product display stand. Heightened product attention is desirable and is a goal for the manufacturer as the heightened product as the attention may increase products sales, however, it may have an undesirable effect on storeowners who want to maintain a range of fresh products on the product display stand since some products may be overlooked by the heightened appearance of certain product packaging.

Therefore, while it is important to illuminate products and information on products for sale in order to draw consumer attention to the products on the product display stand it is also important to draw a customer attention to remaining products on the product display riser once a product has been removed from the product display riser to prevent products from being overlooked and becoming stale.

SUMMARY OF THE INVENTION

A product display system including a product display stand having multiple levels for holding products thereon where the product display stand contains its own lighting thereon to enhance recognition of products thereon through LED lights supported on the product display stand with some LED lights located behind or to the side of a product located on the product display stand to draw attention to the products thereon as well the appearance of remaining products when a product is removed from the product display stand. The LED lights are positionable on a product display stand to draw a persons attention to products thereon with the LED lights accommodating the shape and size of a product thereon by providing lighting around or behind a product thereon so as to conspicuously draw a customers attention to the product on the product display stand.

The product display stand, which may typically be a product display riser, may be located in a freestanding case with the product display stand comprising a plurality of product display risers with each of the product display risers capable of displaying a product while delivering different messages through a product display panel thereon. The illumination of the products and the illumination of the product display panel separable from each other with information on the product display panel illuminated from within the panel to prevent the obscuring information from the consumer through improper external illumination while LED lights located on the product display stand, which may be at least partially or fully hidden from view, can be used to conspicuously call customers attention to the products on the product display riser. The LED lights can also be used to inconspicuously call a customers attention to unsold product through a change in product illumination as result of removal of a product from the product display riser that unbalances light proximate the products on the product display riser. An unbalancing of light proximate or on remaining products may be subtle but never the less real and therefore noticeable to a customer viewing the product display stand, which can aid in preventing remaining products from being overlooked. That is, even though the remaining products on the display stand may not have heightened awareness packaging, the inconspicuous change in product illumination may draw attention to the remaining products on the display stand.

DESCRIPTION OF THE PREFERRED EMBODIMENT

Figure 1:
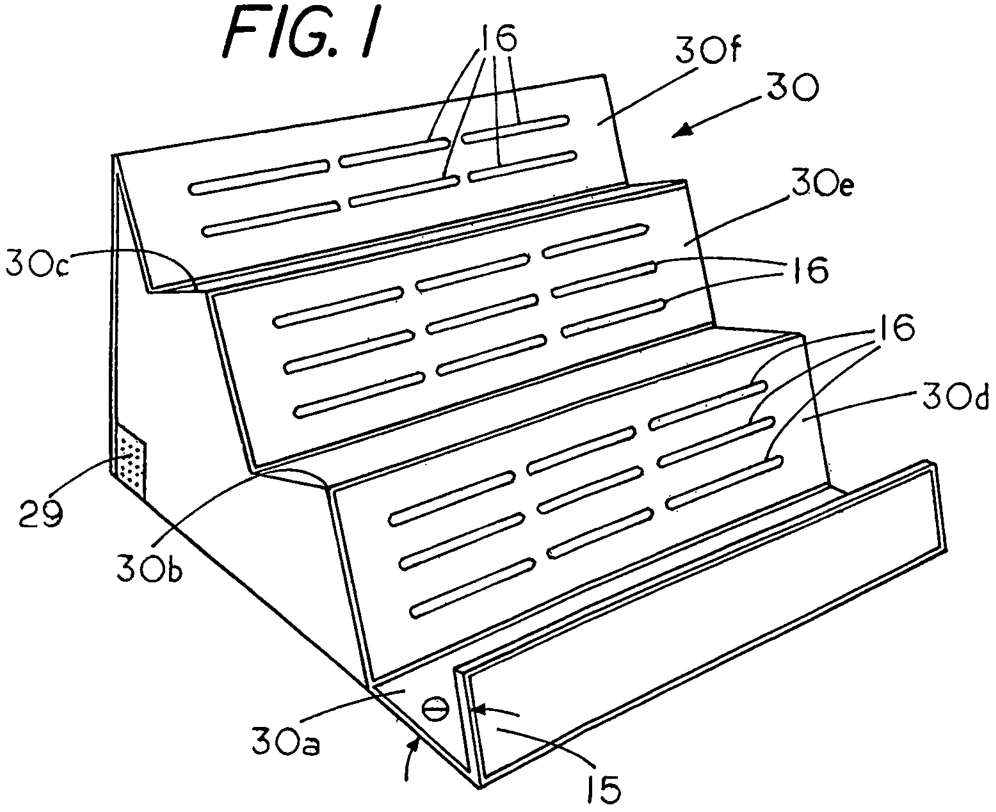
FIG. 1 is a perspective view of a LED illuminated three level product display stand with a control unit and back surface panels each supporting a series of LED strip lights thereon.

FIG. 1 is a perspective view of an embodiment of a three level light-emitting diode (LED) illuminated product display stand or display riser 30 that includes three product support surfaces 30*a*, 30*b*, and 30*c* and three product back panels 30*d*, 30*e* and 30*f*, which extend upward from the product support surfaces. A feature of the embodiment of FIG. 1 is that each of the back panels 30*d*, 30*e* and 30*f* each support multiple sets of LED strip lights 16 thereon, which can function directly or indirectly to assist in highlighting the products displayed on display riser 30. Although the number of LED strip lights may vary the embodiment of FIG. 1 shows back panel 30*f* supporting 9 LED strip lights 16, back panel 30*e* supporting 9 LED strip lights 16, and back panel 30*d* supporting 9 led strip lights 16.

LED lights are known in the art and can be found in various configurations and colors. In the example described herein individual LED lights are located on an elongated strip or roll of LED lights with the elongated strip severable at various locations to form a plurality of LED strip lights 16 that are shown secured to the back panels 30*d*, 30*e* and 30*f*. That is, LED lights are commercially available in elongated strips where groups of LED lights may be cut from the elongated strip to form LED strip lights 16 of different lengths. In some cases batteries may attached to a cut end of the LED strip lights 16 to power the LED strip lights 16 and in other cases a separate external power source can be attached to the end of the LED strip lights 16 to power the LED strip lights 16 and in still other cases a battery may be an integral part of the LED strip lights 16. If the LED strip lights 16 include an adhesive backing the LED strip lights 16 can be quickly secured to a product display stand through simply hand pressure, which allows a person to change or rearrange the product illumination without any tools.

An advantage of use of LED lights in a product display stand such as product display riser 30 is that the LED lights have a long life, can be turned on or off frequently without affecting the life of the LED lights as well as having the ability to function efficiently in either hot or cold temperatures. In addition LED lights generate very little heat while providing illumination from a low voltage power source. As described herein these characteristics make LED lights, which are formed into LED strip lights particularly useful in the invention described herein as the temperature of products on a product display riser do not become elevated even though the use of LED strip lights 16 may come into direct contact with a bottom or a back of the products located on the product display riser 30.

Extending upward from the front of product display riser 30 is an information panel 15, such as an LCD panel, that extends from side to side of the product display riser 30 as well as cantilevering upward preferably at an acute angle Θ from the display ledge 30*a* thereby making it easier for a person standing in front of the product display riser to observe the information panel if the product display riser is located below the persons eye level.

While the LED strip lights 16 may be battery powered from a battery located on the LED strip light 16 or powered from a remote power source the LED strip lights 16 may also include an on/off timer. In this example the LED strip lights 16 can be controlled by a control unit 29 in the product display riser 30. Control unit 29 includes a Central Processing Unit (CPU), a Bluetooth hardware, a cellular chip, and a media player all interconnected to each other for communication with a remote station or a remote processor.

Figure 1A:
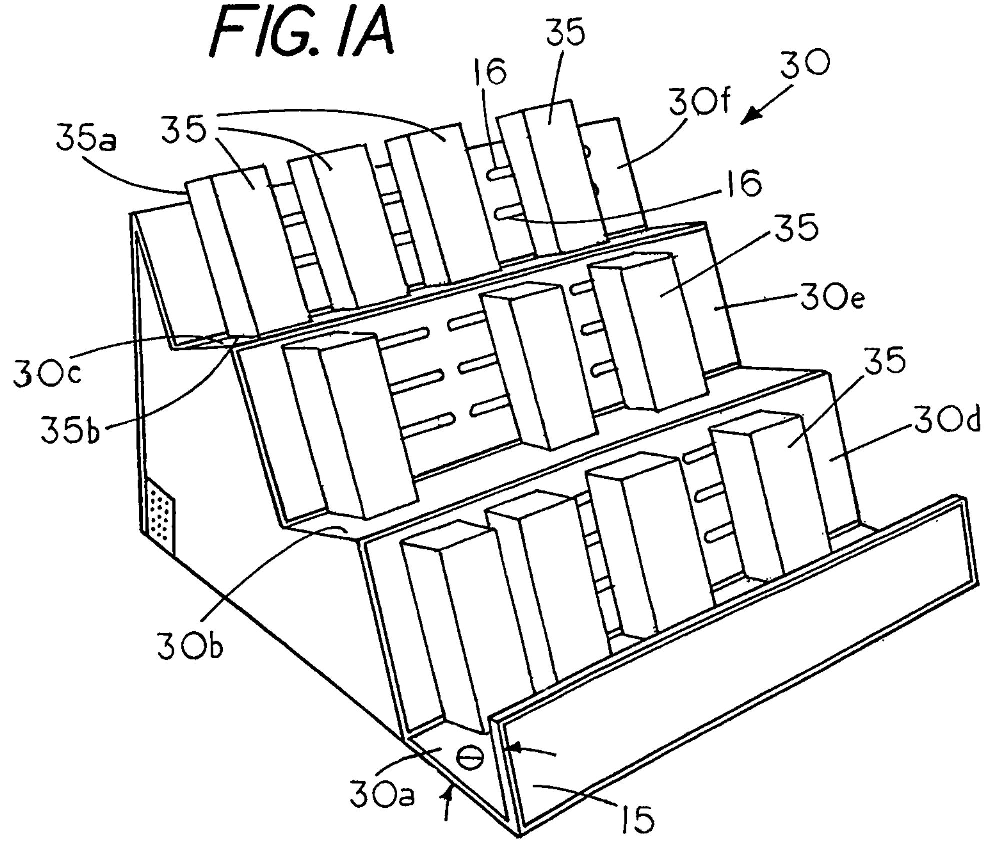
FIG. 1A is a perspective view of the LED illuminated three level product display stand of FIG. 1 with a control unit where a portion of the products have been removed from the product display stand.

FIG. 1A shows the product display riser 30 of FIG. 1 with a plurality of products 35 displayed on the three levels 30*a*, 30*b* and 30*c* of product display riser 30. Note, when the products 35 are placed on the display riser 30 they partially obscure or in some cases completely obscure the LED strip lights 16 that are located on the back panel 30*d*, 30*e* and 30*f*. Consequently, removal of a product 35 from the product display riser 30 changes the illumination around the remaining products to inconspicuously make the remaining products more conspicuous to a viewer. That is, the LED light emitting from a portion of an LED strip light 16, which was hidden behind the product 35, now becomes visible to a viewer located in front of the display riser 30. Thus, a feature of the invention is that removal of a product 35 automatically highlights the remaining products 35 through the exposure of additional portions of the LED strip lights 16 which changes the illumination of the product display riser 30 or the illumination of remaining products on the product display riser 30.

Figure 2:
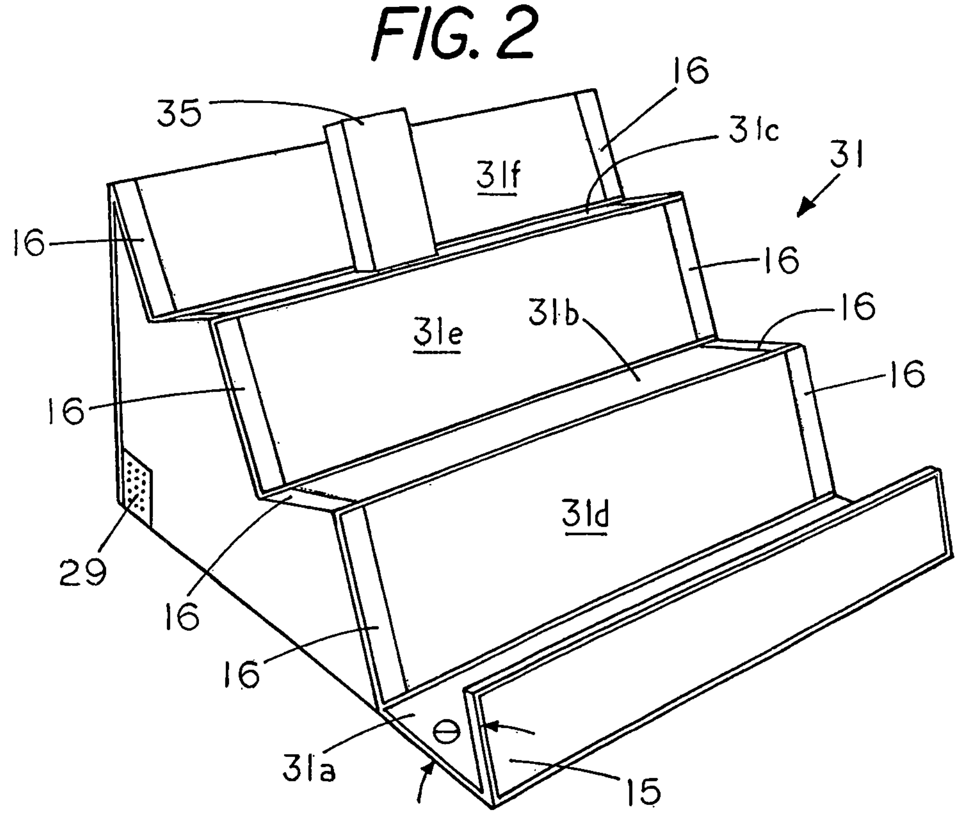
FIG. 2 is a perspective view of a LED illuminated three level product display stand with a control unit and semi-transparent acrylic portions supporting LED strip lights on the edges of the product display stand.

FIG. 2 is a perspective view of an alternative embodiment of a LED illuminated product display riser 31 having multiple product support surfaces 31*a*, 31*b* and 31*c* and multiple back panels 31*d*, 31*e* and 31*f*. In this example the back panels 31*d*, 31*e* and 31*f* are free of LED strip lights 16 while the edge of each back panel 31*d*, 31*e* and 31*f* and the edge of each product support surface 31*a*, 31*b* and 31*c* contain an LED strip light 16 to draw attention to the products located on the display riser 31. In this example removal of a product 35 from the display riser 31 does not increase the light emitted from the LED strip lights 16 since the products placed on the product support surface 31*a*, 31*b* or 31*c* may be placed on the display riser 31 so as not to cover up or obscure the LED strip light 16 located on the edges, however the removal of a product from the product display riser 31 directly or indirectly may change the illumination on remaining products on the product display riser. The change in illumination on remaining products on display riser 31 has the effect of focusing a viewer's attention on the remaining products on the product display riser 31. In this example the LED strip lights 16 are located along the edges of the product display riser 31 to initially and conspicuously call a viewers attention to products located on the product display riser 31 and to inconspicuously call a viewers attention to any unsold products on display riser 31 as products are sold and removed from the display riser 31.

Figure 3:
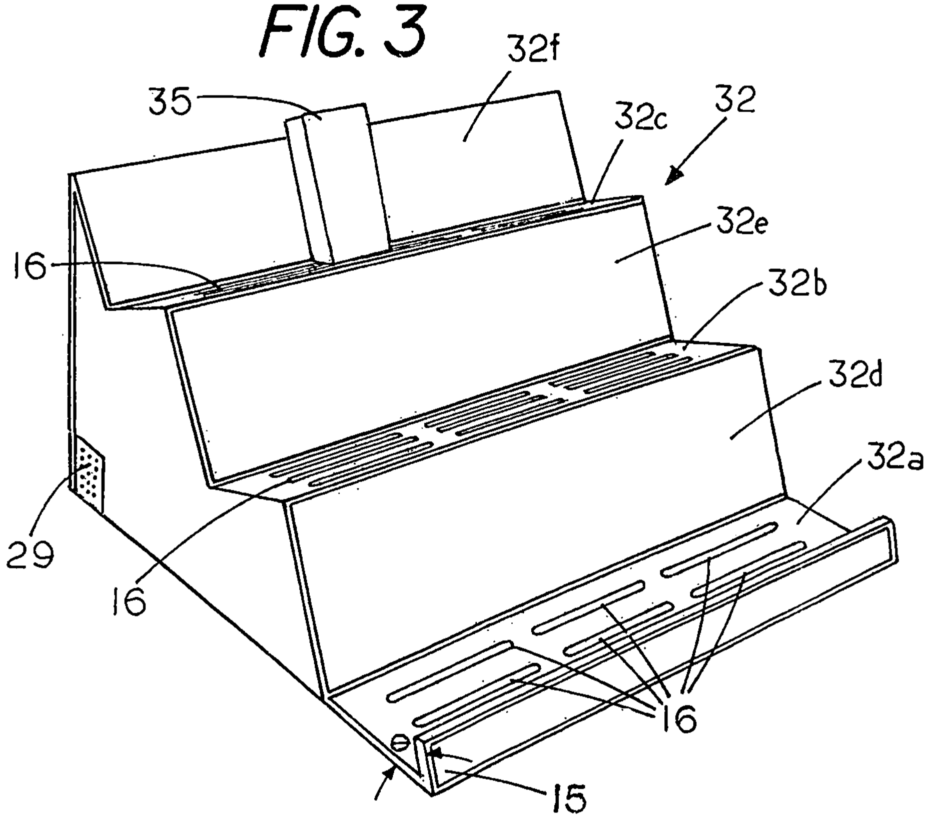
FIG. 3 is a perspective view of a LED illuminated three level product display stand with a control unit and product support surfaces for displaying a product thereon with at least one of the product support surfaces supporting a plurality of LED strip lights thereon.

FIG. 3 is a perspective view of an alternative embodiment of a LED illuminated display riser 32 having multiple product support surfaces 32*a*, 32*b* and 32*c* and multiple back panels 32*d*, 32*e* and 32*f*. In this example the back panels 32*d*, 32*e* and 32*f* are free of LED strip lights 16 while the each of product support surface 32*a*, 32*b* and 32*c* contain nine LED strip lights 16. A removal of a product from the display riser 32 increases the upward light emitted from the LED strip lights 16, which are located on the support surface 32*a*, 32*b* and 32*c*. Thus, in this example removal of a product from the display riser 31 automatically and conspicuously changes the upward illumination from the product support surfaces 32*a*, 32*b* and 32*c*. The change in upward illumination 35 focus a viewer's attention to the remaining product or products on display riser 31. Thus, in this example the LED strip lights 16, which direct light upward from riser 31, inconspicuously call a viewers attention to any unsold product 35 on display riser 31 through the removal of products located on the strip lights 16 on display riser 31.

Figure 4:
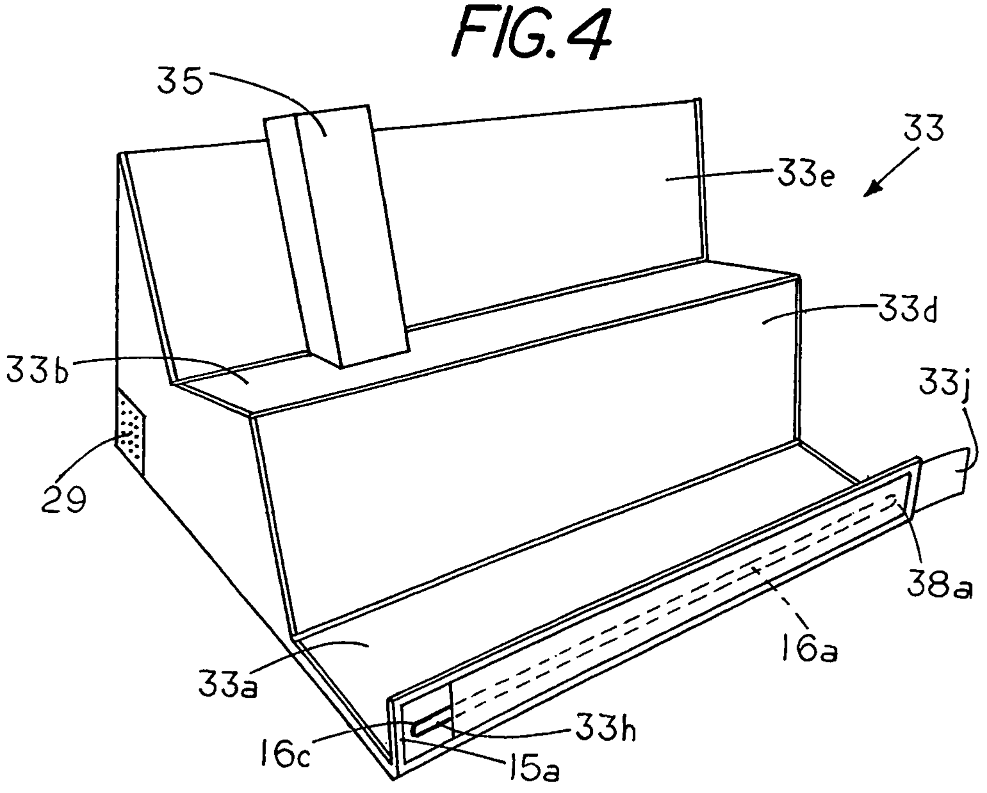
FIG. 4 is a perspective view of a LED illuminated two level product display stand with a control unit and an information display panel that includes a LED strip light supported thereon.

FIG. 4 is a perspective view of an alternative embodiment of display risers comprising a two level light-emitting diode (LED) illuminated display riser 33 having two product display surfaces 33*a* and 33*b* as well as two back panels 33*d* and 33*e*. Display riser 33 includes a front information display panel 15*a* secured to display riser 33. A feature of the embodiment of FIG. 4 is that the information display panel 15*a* includes a strip of LED lights 33*h*, which function to highlight product information contained on a semi-transparent vinyl print 33*j*, which is located in front of the LED lights 33*h* as a product 35 is displayed on display riser 33. In this example the semi-transparent vinyl print 33*j* is slidably secured to the information display panel 15*a* with the vinyl print 33*j* illuminated through a strip of LED lights 33*h* located behind the vinyl print 33*j*. The illuminated changeable vinyl print 33*j* functions to conspicuously draw attention to display riser 33 and any product 35 on display riser 33 through LED illumination of the front of the display riser 33.

Figure 5:
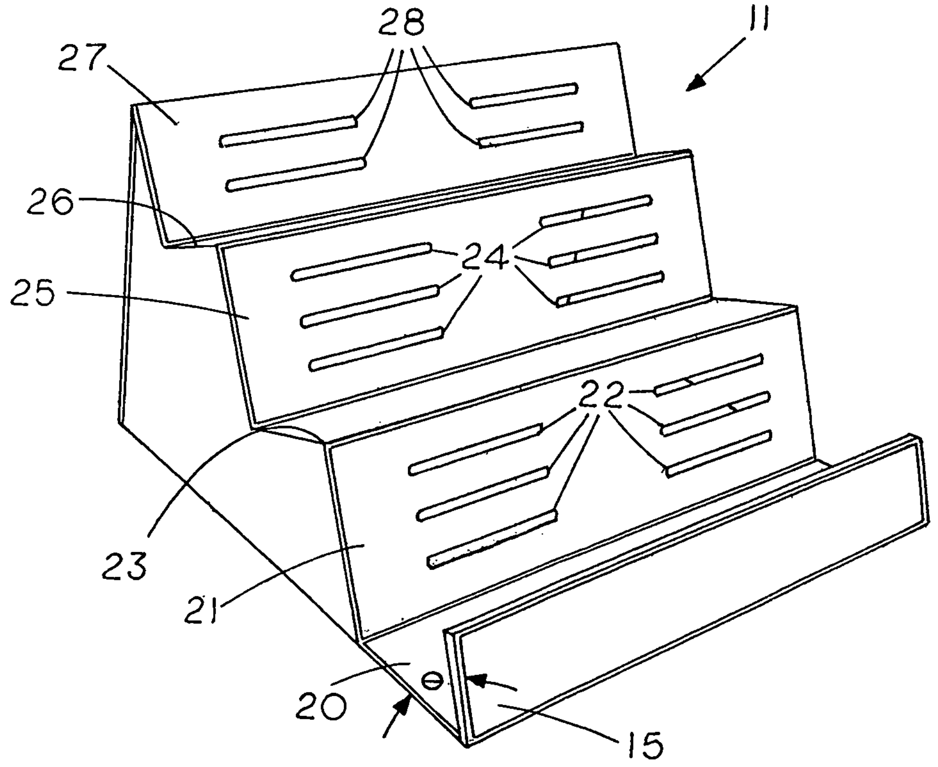
FIG. 5 is a perspective view a LED illuminated three level product display stand and information display panel without a control unit.
Figure 7:
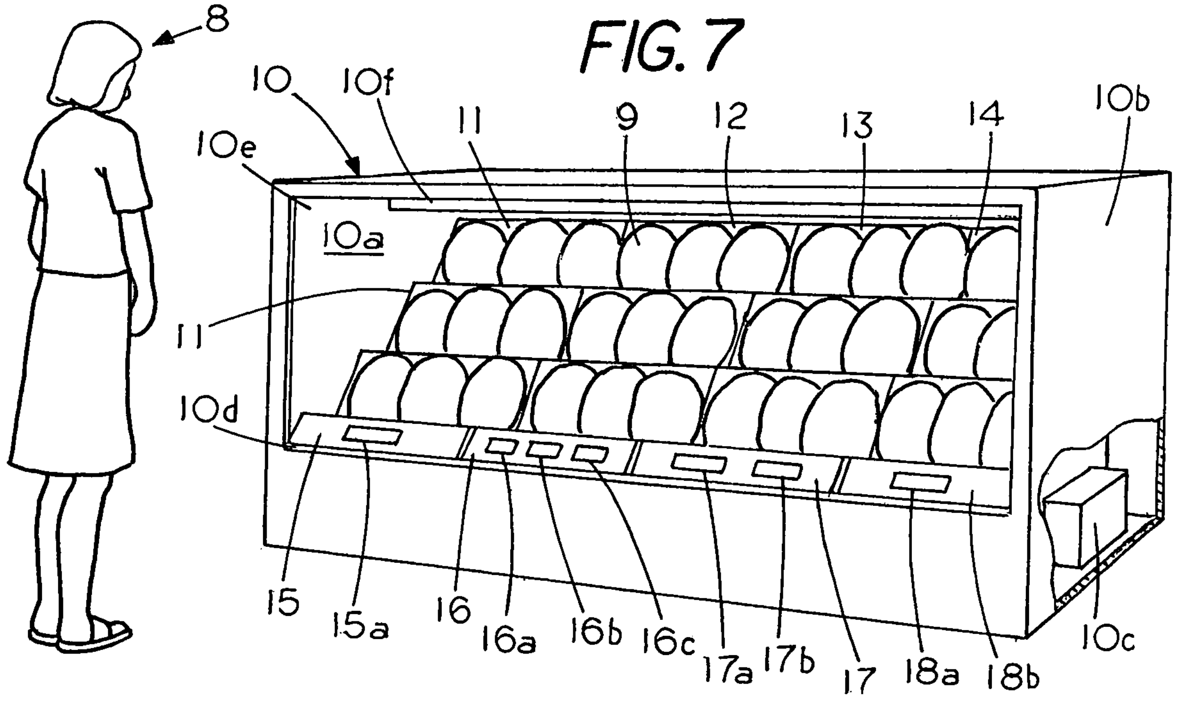
FIG. 7 is a perspective view of a customer in front of a freestanding refrigerator case containing a set of product display stands.

FIG. 5 shows an isolated perspective view of a product display stand 11 having a first product support surface 20 with a back panel 21 having ribs 22, a second product support surface 23 with a back panel 25 having ribs 24, and a third product support surface 26 with a back panel 27 having ribs 28. In this example the ribs do not contain LED strip lights but may help in frictionally holding products thereon. Extending upward from the front of product display stand 11 is an information panel 15, such as an LCD panel, that extends from side to side of the product display stand 11 as well as cantilevering upward preferably at an acute angle Θ from the display ledge 20 thereby making it easier for a person standing in front of the product display stand 11 to view the information panel 15. The product display stand 11, which FIG. 7 shows located in the refrigeration case 10, enables a viewer 8 to inspect rows of meat products 9 within the refrigeration case 10 as well as view information on the LCD display panel 15 while standing in front of the refrigerator case 10. In this example the LCD display panel 15 calls a viewers attention to the product display stand 11 and the products thereon.

The display panel 15 preferably comprises a liquid crystal display since the display panel is thin and operates without generating heat that may affect perishable products on the product display stand. A further feature is that the LCD panel generates its own light thus eliminating problems of poor external lighting of signs within the refrigeration case. As shown in FIG. 5 display panel 15 cantileverly extends upward from the support ledge 20 and from side to side of product display stand 11. A feature of the LCD panel is that the LCD panel can form a front stop for a product located on ledge 20 without affecting the product since the LCD panel does not generate heat that would spoil the product in contact therewith. Thus a further feature of the use of the LCD panel in the refrigeration case is that the information panel can be illuminated independent of the light on the products.

Figure 6:
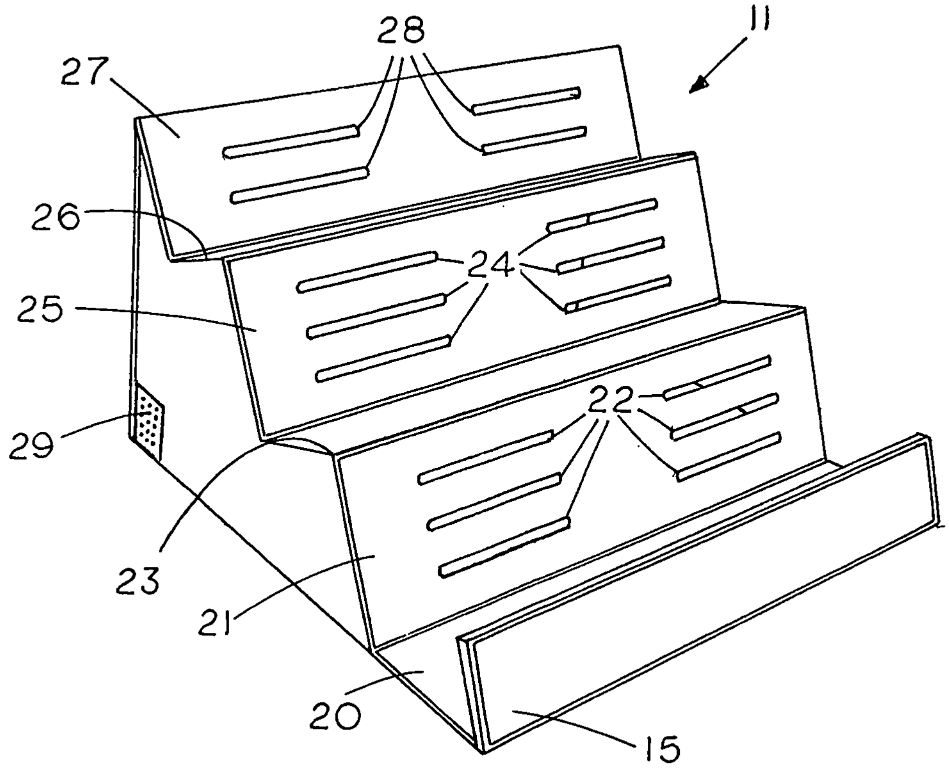
FIG. 6 is a perspective view of a three level product display stand having an information display panel and a control unit that can be remotely controlled to select images and control the message or images on the information display panel.

FIG. 6 is a perspective showing an embodiment of an identical display shelf riser or product display stand 11 as shown in FIG. 5 with the display shelf riser supportable and displayable in an enclosed refrigerated deli display case. As shown in FIG. 6 display stand 11 includes a riser body having at least two product supporting surfaces of different heights or steps for receiving and displaying refrigerated deli products such as meats and dairy products thereon in an enclosed refrigerated deli display case. However, unlike the display stand of FIG. 5, the display stand of FIG. 6 includes a control unit 29 that includes a Central Processing Unit (CPU), a Bluetooth hardware, a cellular chip, and a media player all interconnected to each other and the LCD panel and all preferably located within the housing of product display stand 11. Thus, in the example of FIG. 6, if desired, an operator can control or change the content of information panels 15 on each of the product display stands from a remote location.

FIG. 7 is a perspective view of a prospective customer 8 peering into a freestanding refrigerator display case 10. Refrigerator display case 10 includes a housing 10*b* having a product display compartment 10*a* and a refrigeration unit 10*c* for maintaining the product display compartment 10*a* at a safe storage temperature. In this example perishable products such as hams 9 are shown although other types of products including cheese products may also be displayed. Located within display compartment 10*a* is a display case shelf 10*d*, which extends from side to side and front to back of case 10 to provide support for the perishable products located within the housing 10*b*. A transparent viewing panel 10*e* at the front of refrigerator display case 10, which is low to the floor, allows the prospective customer 8 to peer down into the product display compartment 10*a* from a position outside and in front of the product display compartment 10*a*. Customer 8 can view the row of products 9 therein, which are supported on a set of four product display stands 11, 12, 13 and 14 that display the perishable product 9 in a customer viewable position. An incase light 10*f* extends across the top of the refrigeration case 10 to illuminate the contents of the refrigerator case.

In this example, product information panels, which are on each of the product display stands 11, 12, 13, and 14, may be informationally coordinated to provide both static and dynamic consumer information about the products on the product display stands through control unit 29. Although four product display stands are shown more or less product display stands may be used without departing from the spirit and scope of the invention. A feature of the use of multiple product display stands each with a frontal information panel that can be changed on the go is that more information can be displayed and delivered to a customer. An additional feature is the shifting of display information from one information panel to an adjacent information panel has the added benefit of avoiding problems of image persistence if the information panels are LCD panels.

In the example shown in FIG. 7 four-product display stands 11, 12 13, and 14 are shown with each of the product display stands each having an information panel with a different message. That is, product display stand 11 has an LCD panel 15 with an image 15*a* thereon. Product display stand 12 has an LCD panel 16 with images 16*a*, 16*b* and 16*c* thereon. Product display stand 13 has an LCD panel 17 with an image 17*a* and 17*b* thereon and product display stand 14 has an LCD panel 18 with an image 18*a* thereon. A feature of the invention is that each of the product display stands displays consumer information thereon with each display stand information panel self illuminated and changeable on-the-go. If desired, the content of the information on the LCD panel can be changed manually or automatically. In the example shown the self-illuminated information display panel on the product display stand is located at an acute angle to the horizon so that person standing outside the refrigerator case and looking downward can readily view or read the information on the display panel.

Thus, the present invention includes a product display stand with a self illuminated information delivery system that includes a self illuminated information panel for use in refrigerated cases such as deli display cases or the like. A feature of the invention is the information on the information panels can be changed on-the-go either through manual, mechanical or electrical controls. The self illumination of the information through internal light generation within the information panel allows one to ensure that the information signs on the product display stand are visible and readable regardless of the condition of the product lighting within a refrigeration case. The changing of the information on the information panel on-the-go also has the benefit of enhancing the consumer's attention to the product being displayed through conspicuous awareness.

Another feature of the present invention is that the product display stand with the self illuminated information panel may be readily used with most existing refrigerated product display cases or poorly lit display cases since the information panel generates its own internal light independent of the light directed onto the products located in the refrigerator case. As the products are three-dimensional packages the product lighting can be important in order to avoid shadows that would obscure the product. However, proper product lighting does not ensure proper lighting of the information signs located in the refrigeration case. In the invention described herein one can use the internal lighting within the refrigerator case or some cases one may use external lighting outside the refrigerator case to properly illuminate the products within the display case. Often the incase lighting or the external lighting may or may not properly illuminate the prior art information signs in the refrigeration case. In this invention the information display panel is independently illuminated through a device such as a LCD panel that generates its own light through back lighting. The use of backlighting allows one to display product information in a consumer readable manner, which is not dependent of the lighting within the refrigerator case thus ensuring that the consumer can properly view both the product and the information on the products, which are both, located in the refrigeration case.

Figure 8:
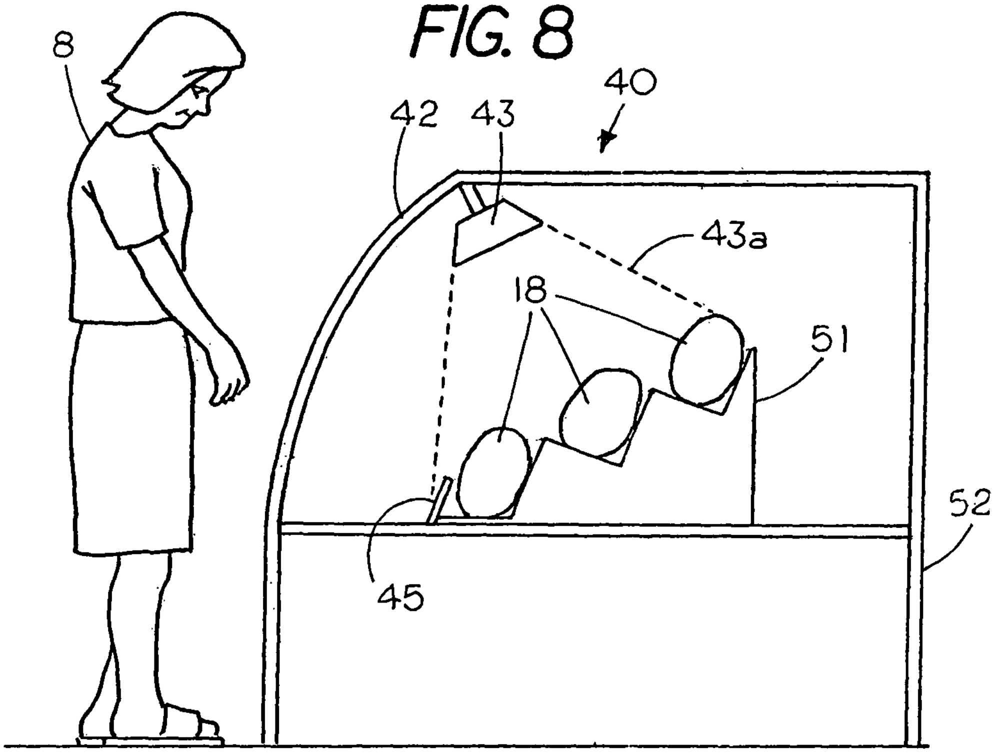
FIG. 8 is a side view of a customer in front of a refrigeration case where meat products are illuminated by an incase light and the information panel on the product display stand contains a self illuminated panel viewable through a viewing window on the refrigeration case.

FIG. 8 shows an alternate embodiment where the product lighting is supplied by a light 43 that projects a light beam 43*a* directly onto the perishable products 18 within the case while the information panel 45 supplies its own illumination. In this example, refrigeration case 40 includes a housing 42 with a front viewing window 42 that allows a consumer 8 to view the products in the refrigeration case 40. In this example the refrigeration case 40 the incase light 43 projects a light beam 43*a* that directly illuminates the meat products 18 located on the product display stand 51 while the information panel 45 located in front of the products 18 supplies its own illumination so that the consumer can readily view the images on the information panel 45.

Figure 9:
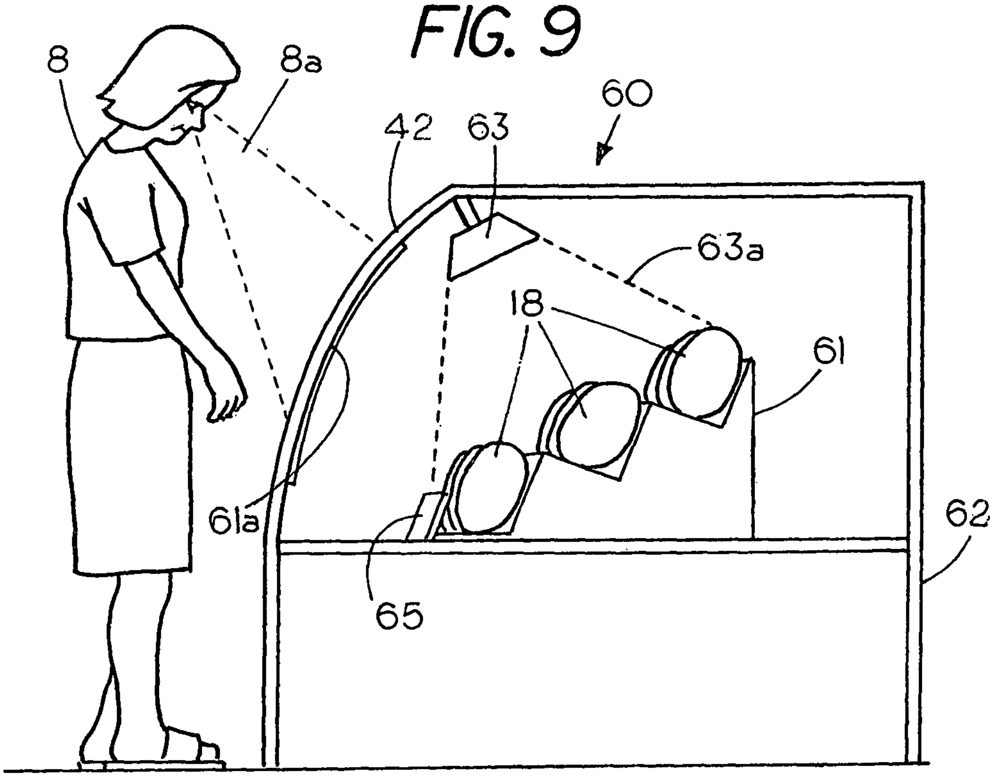
FIG. 9 is a side view of a customer in front of a refrigeration case where meat products are illuminated by an incase light and an information panel is viewable through a viewing window on the refrigeration case.

FIG. 9 shows an alternate embodiment where the refrigeration case 60 includes a product display stand 61 with a perishable product such as meat products 18 located thereon, which is similar to FIG. 3. In this example, an information panel 61*a* is located on the window 42 of the refrigeration case 60. An incase light 63 directs light beam 63*a* onto the products 18 on the product display stand 61. Instead of an LCD information panel on the front of the product display stand 61 the stand includes a projector 65 that projects images onto a transparent view screen 61*a*, which is located on the inside of display window 42, which allows the information to become visible to a person 8 standing outside the refrigeration case 60. For example, projector 65 may be a short throw projector or some other type of image projection system connected to the body of the display riser stand 61 that can be used to project images on the information panel 61*a*, which comprises a viewing screen or film located on the inside surface of transparent window 42. In this example the projector 65 functions to project product information in the form of a video image onto a transparent viewing film 61*a* located on an interior surface of transparent display window 42 of the enclosed refrigerated deli display case 60 rather than proximate a product located on the product display stand 61. In this example the consumer 8 has a first field of vision 8*a* to view the informational panel and a second field of vision to view the products 18 within the refrigerator with both viewable from the same position outside the refrigerator case.

Although a LCD panel has been described other back lit panels may be used. The informational panel may comprise a variety of shapes and sizes, in the embodiment shown the LCD panel is shown as comprising a rectangular shaped body having a width of 24 inches or less and a height of 4 inches or less. In this example, which is shown in FIG. 4 the panel can interact with the Central Processing Unit (CPU), the Bluetooth hardware, the cellular chip, and the media player to display refrigerated deli products information and/or video images thereon. A feature of the invention is that the cellular chip connected to the Central Processing Unit is also in communication with the media player to enable the media player to update the content that is displayed on the information panel.

One of the advantages in the use of the LCD information panel in a refrigerated case is that product information or images displayed on the information panel 45 are less likely to be affected by illuminant lighting issues that may occur with some systems. The presence of the LCD panel also enables the display shelf stand of FIG. 4 to be used in both an enclosed and an unenclosed refrigerated deli display case since the display shelf stand of FIG. 4 does not require an external surface for receiving the product information. Another feature of the displayer stands is that the control unit 29 may include at least one speaker for delivering an audio product information message to the consumer in conjunction with the visual image, which may be useful with open front display cases.

Figure 10:
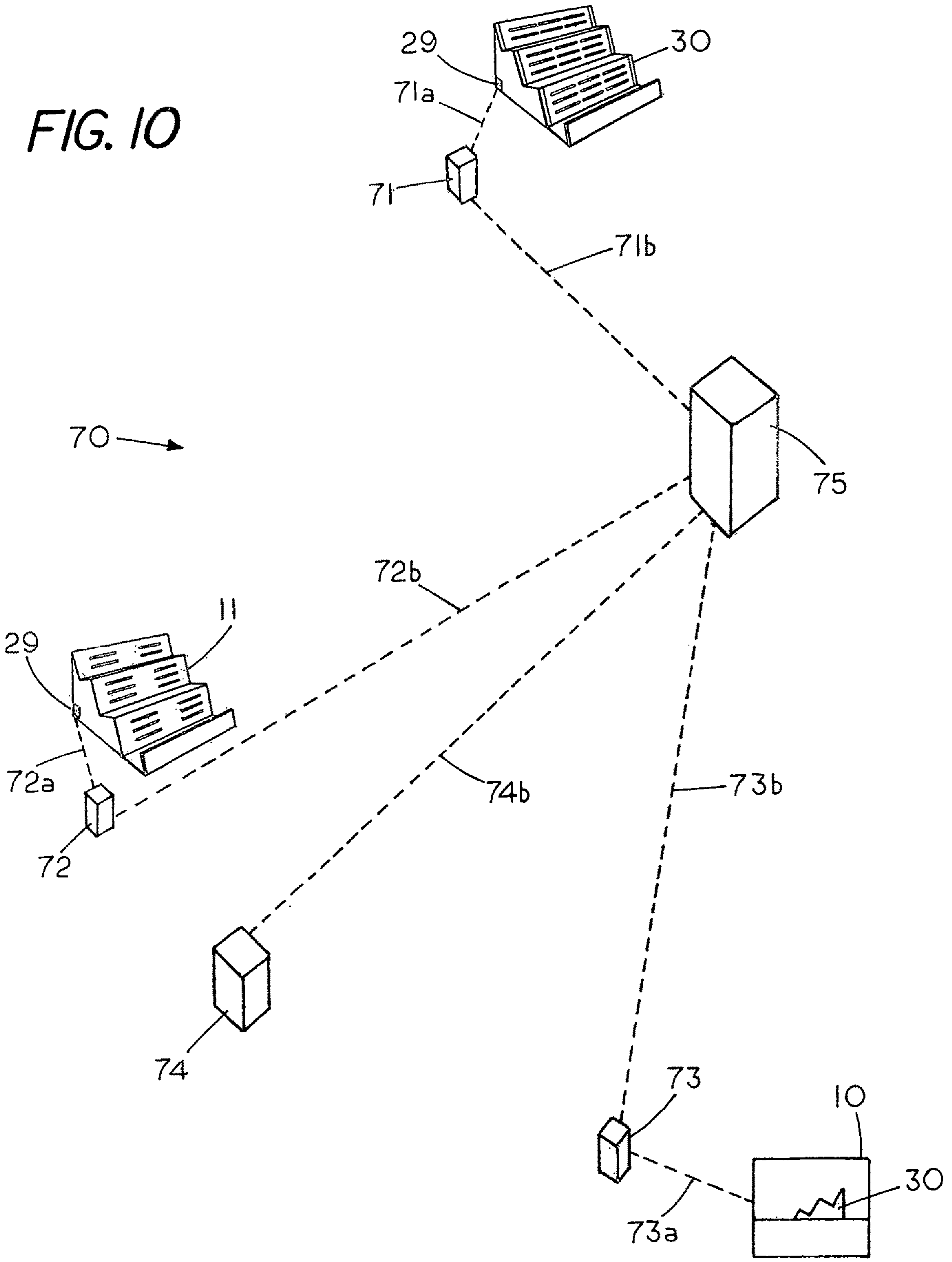
FIG. 10 is a system for communicating between product display stands and a person remote from the product display stands for changing illumination of the product display stands as well as information displayed on front information panels.

FIG. 10 shows system 70 that includes a central processing unit 75 that communicates via Wi-Fi (71*b*) with a first display riser 30 through a transceiver 71 that is in blue tooth communication 71*a* with control unit 29, which is located in display riser 30. Central Processing unit 75 also communicates via Wi-Fi (72*b*) with a second display riser 11 through a transceiver 72 that is in blue tooth communication (72*a*) with control unit 29 on display riser 11. In addition, Processing unit 75 also communicates via Wi-Fi (73*b*) with a third display riser 30 through a transceiver 73 that is in blue tooth communication (73*a*) with a control unit 29 on display riser 11.

In this example the Processing unit 75 also communicates with a smartphone 74 via Wi-Fi (74*b*) to enable a person remote from the display risers to change the lighting so that attention is drawn to products on the display risers.

In the system described herein the awareness of the products on the display stand can be performed either through the removal of a product from a display stand or through a remote processor that changes the product illumination or the product message on an information panel.

As described herein the invention includes the method of illuminating products to conspicuously call a customers attention thereto by placing a product display stand i.e. 30, 31, 32 having an information panel 15 on a shelf and then placing a product 35 on the product display stand where the product is supported and displayed for customer viewing. One can and illuminate the product on the product display stand with a first light while placing a set of LED strip lights 16 that may or may not illuminate the product 35 on the product display stand. If not illuminated one can illuminate the product 35 on the display stand through a further set of LED strip lights 16.

With products on the product display stand one can illuminate a product information panel on the product display stand through backlighting an LCD product information panel on a front portion of the product display stand.

A feature of the invention is the placing of a plurality of products over the set of LED strip light to conceal the illumination therefrom when the plurality of products is supported on the product display stand so that when one removes a product from the plurality of products it exposes a portion of the LED strip light to conspicuously draw a customers attention to remaining products on the product display stand.

Alternately one may position the set of LED strip lights so removal of a plurality of products from the product display stand does not expose the set of LED strip lights although product illumination on the product display stand may be changed by the removal of products from the product display stand. In still other embodiments one may place a set of LED strip lights on an outer portion of the product display stand to call a viewers attention to a product located on an interior portion of the on the product display stand 31.

I claim:

1. A product display stand comprising:

a first product support surface for supporting an end of a product thereon;

a back panel adjacent said first product support surface for supporting a backside of the product thereon;

a LED strip light located on said back panel with the LED strip light having a light output with the light output creating a conspicuous product illumination; and a plurality of products supported on the first product support surface and the back panel with the plurality of products obscuring at least a portion of the conspicuous product illumination from the LED strip light to create a first illuminated product display when the plurality of product are located on the product display stand and a different illuminated product display when a one of the plurality of products is removed from the product display stand with a difference in the first illuminated product display and the different illuminated product display inconspicuously calling a viewers attention to a remaining plurality of products on the product display stand without a change in the light output from the LED strip light.

2. The product display stand of claim 1 including at least three LED strip lights on the back panel.

3. The product display stand of claim 1 including a further LED strip light on said first product support surface.

4. The product display stand of claim 1 including a front panel with a LED strip light thereon.

5. The product display stand of claim 1 including at least two product support surfaces and at least two back panels with each having a LED strip light thereon.

6. A product display riser for conspicuously calling a viewers attention to a plurality of product thereon comprising:

a first product support surface with a first back panel adjacent said first product support surface with said first product support surface and said first back panel cooperating to support at least one of the plurality of products at a first elevation;

a second product support surface with a second back panel adjacent said second product display with said second back panel cooperating with said second product support surface to support at least one of the plurality of products at a second elevation different from the first elevation; and a first set of LED strip lights located along an outside edge of said first product support surface, said first back panel, said second product support surface and said second back panel and a second set of LED strip lights located along an opposite edge of said first product support surface, said first back panel, said second product support surface and said second back panel with said first LED strip lights and said second LED strip lights conspicuously calling a viewers attention to the plurality of products located on said product display riser and a removal of a one of plurality of products inconspicuously calling a viewers attention to a plurality of products remaining on the product display stand without a change in the light output from either the first LED strip lights or the second LED strip lights.

7. The product display riser of claim 6 including a LCD front panel on the product display riser.

8. The product display riser of claim 6 including a control unit that includes a Central Processing Unit (CPU), a Bluetooth transceiver, a cellular chip, and a media player all interconnected to each other for transmission to a further transceiver with said further transceiver in Wi-Fi communication with a central processing unit.

9. The product display riser of claim 6 wherein the back panel contains at least three LED strip lights each laterally spaced from each other.

10. The product display riser of claim 6 wherein each of the first LED strip lights or the second LED strip lights is battery powered.

11. The product display riser of claim 6 including a battery and on/off switch for powering or depowering the LED strip lights.

12. The product display riser of claim 11 wherein the on/off switch is responsive to a signal from a remote processor.

13. The product display riser of claim 12 wherein the LED strip lights have an adhesive backing for securing to the product display riser and each has a separate power source.

* * * * *